(12) United States Patent
Yocum

(10) Patent No.: US 10,058,216 B2
(45) Date of Patent: Aug. 28, 2018

(54) BEVERAGE CONTAINER TEMPERATURE SLEEVE

(71) Applicant: David Yocum, Zanesville, OH (US)

(72) Inventor: David Yocum, Zanesville, OH (US)

(*) Notice: Subject to any disclaimer, the term of this patent is extended or adjusted under 35 U.S.C. 154(b) by 41 days.

(21) Appl. No.: 15/177,797

(22) Filed: Jun. 9, 2016

(65) Prior Publication Data
US 2017/0224163 A1    Aug. 10, 2017

Related U.S. Application Data

(60) Provisional application No. 62/388,739, filed on Feb. 8, 2016.

(51) Int. Cl.
 A47J 39/00    (2006.01)
 A47J 41/00    (2006.01)
 B65D 81/38    (2006.01)

(52) U.S. Cl.
 CPC ......... A47J 41/005 (2013.01); A47J 41/0066 (2013.01); B65D 81/3886 (2013.01); B65D 81/3897 (2013.01)

(58) Field of Classification Search
 CPC . A47J 41/005; A47J 41/0066; B65D 81/3886; B65D 81/3897
 USPC .. 220/592.16, 592.17, 592.2, 737, 738, 739, 220/740, 741, 742, 614, 681; 215/387, 215/390, 45
 See application file for complete search history.

(56) References Cited

U.S. PATENT DOCUMENTS

| | | | | |
|---|---|---|---|---|
| 4,768,354 A | * | 9/1988 | Barnwell | B65D 81/3883 220/592.17 |
| 6,571,564 B2 | * | 6/2003 | Upadhye | A47J 36/2438 165/80.5 |
| 2009/0078711 A1 | * | 3/2009 | Farone | A47J 36/28 220/592.22 |
| 2011/0192859 A1 | * | 8/2011 | Belford | B65D 81/3876 220/739 |
| 2016/0264328 A1 | * | 9/2016 | Barger | H02G 3/0487 |

* cited by examiner

Primary Examiner — Kareen Thomas
(74) Attorney, Agent, or Firm — Furr Law Firm; Jeffrey Furr, Esq.

(57) ABSTRACT

The present invention is a sleeve that is place or wrapped around a beverage container. The sleeve is designed to either heat the beverage container to keep or change the temperature of the liquid within the beverage container. It can also be used to keep a users hand warm while drinking a cool beverage.

5 Claims, 7 Drawing Sheets

BEVERAGE CONTAINER TEMPERATURE SLEEVE

CROSS-REFERENCES TO RELATED APPLICATIONS (IF ANY)

This application claims the priority date of Provisional Application No. 62/388,739 filed on Mar. 3, 2016.

BACKGROUND

1. Field of the Invention

The present invention relates to a Beverage Container Temperature Sleeve device and more particular one that heats the container.

2. Description of Prior Art

Cooling or heating a beverage or the keeping a beverage hot is an age old problem that is still looking for a proper solution. There are many insulated beverage containers out there but that does not help when a user has a non-insulated beverage container such as a normal glass or cup from the cupboard.

There is still room for improvement in the art.

SUMMARY OF THE INVENTION

The current invention involves a sleeve that is placed or wrapped around a beverage container like a glass, cup, bottle or can. The sleeve is designed to either heat the beverage container to keep or change the temperature of the liquid within the beverage container.

It is a sleeve that has a built in warmer that can be activated. It will keep the drink warm. It will be designed to fit on any size of beverage container. The device can also be designed to keep a user's hand warm while drinking a cold drink. This is especially helpful on a cold day.

The sleeve will have a heating layer and an insulation layer. The heating layer will contain a heating means while the insulation layer will insulate the heating means froth the user's hand or from the cool beverage container.

The heating sleeve is more efficient, effective, accurate and functional than the current art.

BRIEF DESCRIPTION OF THE DRAWINGS

Without restricting the full scope of this invention, the preferred form of this invention is illustrated in the following drawings.

DESCRIPTION OF THE PREFERRED EMBODIMENT

There are a number of significant design features and improvements incorporated within the invention.

Figure 1:
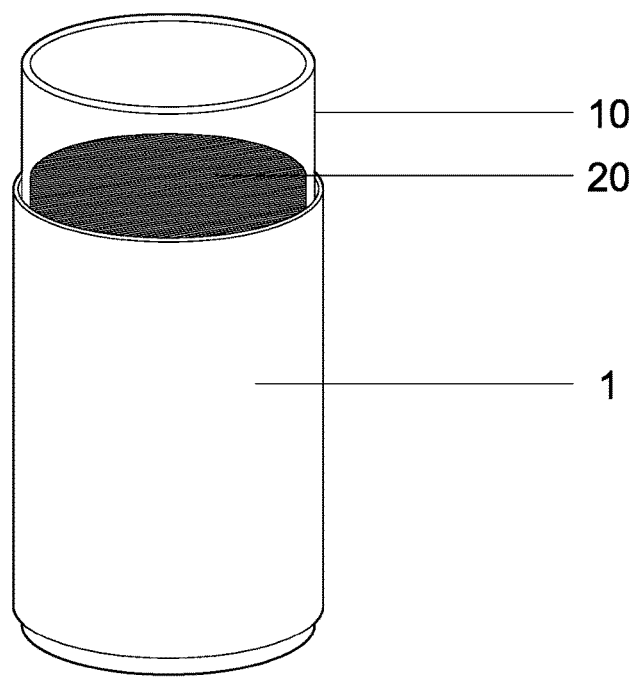
FIG. 1 shows a view of the heating sleeve round a beverage container.

The present invention, as shown in FIG. 1, is a sleeve 1 that is placed or wrapped around a beverage container 10. The sleeve 1 is designed to either heat beverage container to keep or change the temperature of the liquid 20 within the beverage container 10.

It is a sleeve 1 that has a built in warmer means that can be activated. It will keep the drink 20 warm. It will be designed to fit on any size of beverage container. The device 1 can also be designed to keep a user's hand warm while drinking a cold drink. This is especially helpful on a cold day.

Figure 2:
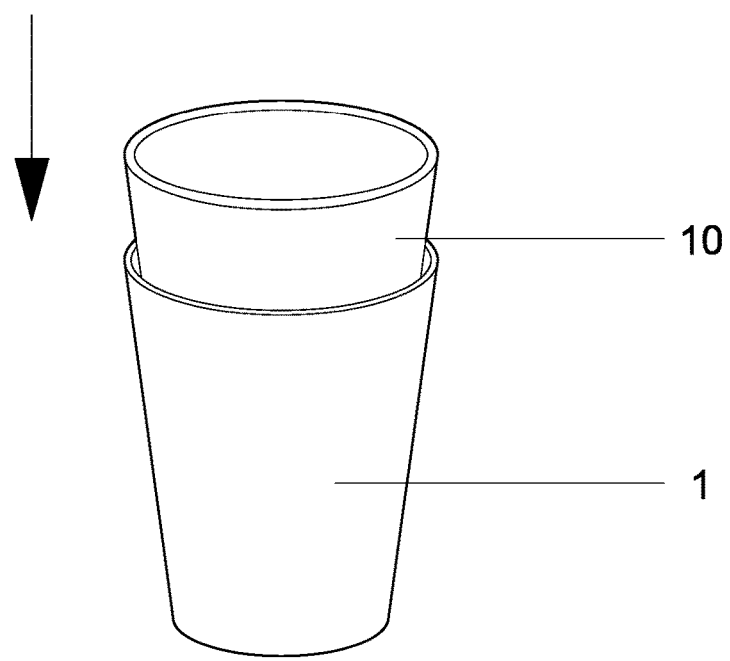
FIG. 2 display a sleeve in a conical shape.
Figure 3:
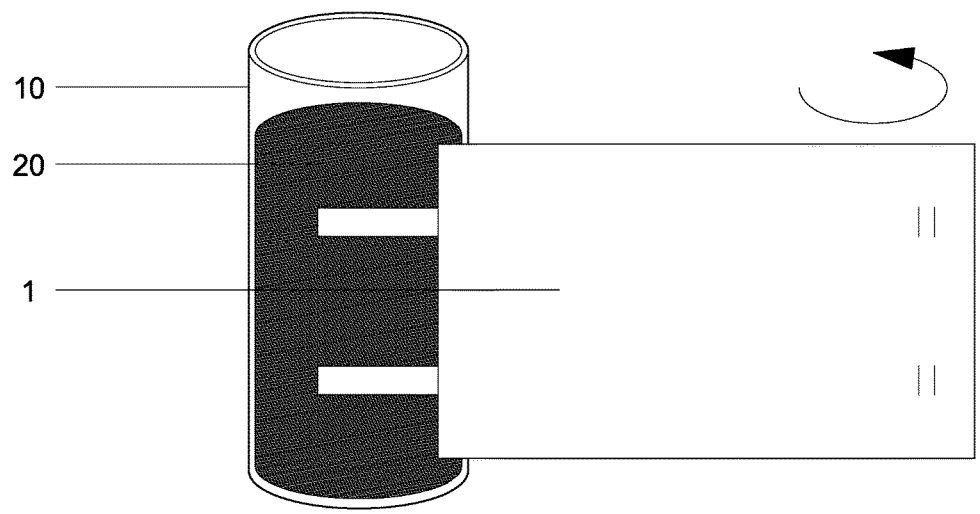
FIG. 3 displays a sleeve as a wrap.

In the preferred embodiment, the sleeve 1 is conical in shape as shown in FIG. 2 with an opening on the top and bottom. The beverage container 10 is placed into the inside of the sleeve 1 through the top opening. It can be made in different sizes and shapes to work with different size and shape of beverage containers 10. The sleeve 1 can also be designed as a wrap that can wrap around a beverage container 10 as shown in FIG. 3. The wrap can be can held in place through a connection means such as a tab and slots or an elastic band or tie or an adhesive surface giving a secure fit.

Figure 4:
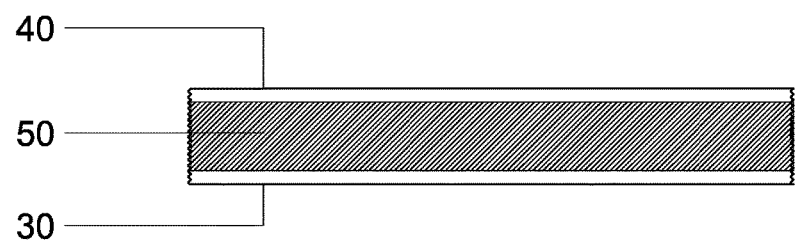
FIG. 4 display a cross cut of the sleeve with the layers.

As shown in FIG. 4, the sleeve 1 will have a heating layer 50 and an insulation layer 30. The heating layer 50 will contain a heating means while the insulation layer 30 will insulate the heating means from the user's hand or from the cool beverage container 10. There will be a enclosure layer 40 which encloses the heating means between it and the insulation layer 30.

The heating means in the preferred embodiment would be a chemical reaction. Crystallization types of warmer generate heat through the exothermic crystallization of supersaturated solutions (typically sodium acetate) and are usually reusable. These can be recharged by immersing the handwarmer in very hot water until the contents are uniformly fluid and then allowing it to cool. The release of heat is triggered by flexing a small metal disk in the sleeve, which generates nucleation centers that initiate crystallization. Heat is required to dissolve the salt in its own water of crystallization and it is this heat that is released when crystallization is initiated. An electric or other types of heating means can be used.

Figure 5:
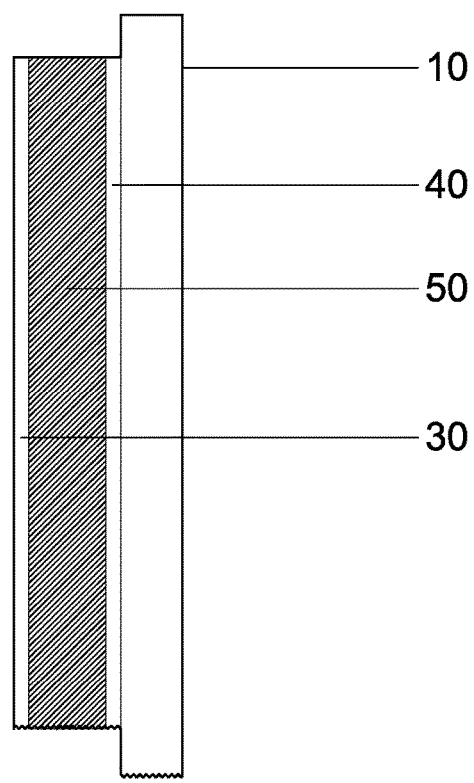
FIG. 5 shows a cross cut view of the sleeve being used to keep the drink warm.

FIG. 5 displays a crosscut of the sleeve 1 being used to heat and/or keep a beverage warm in the beverage container 10. The enclosure layer 40 will be against the outside wall of the beverage container 10. The insulation layer 30 will be on the outer side of the sleeve 1 to protect the user from the heat with the heating layer 50 between the insulation layer 30 and the enclosure layer 40. The insulation layer 30 can have a grip able surface or material making it easier for the user to maintain their hold on the beverage container 10.

Figure 6:
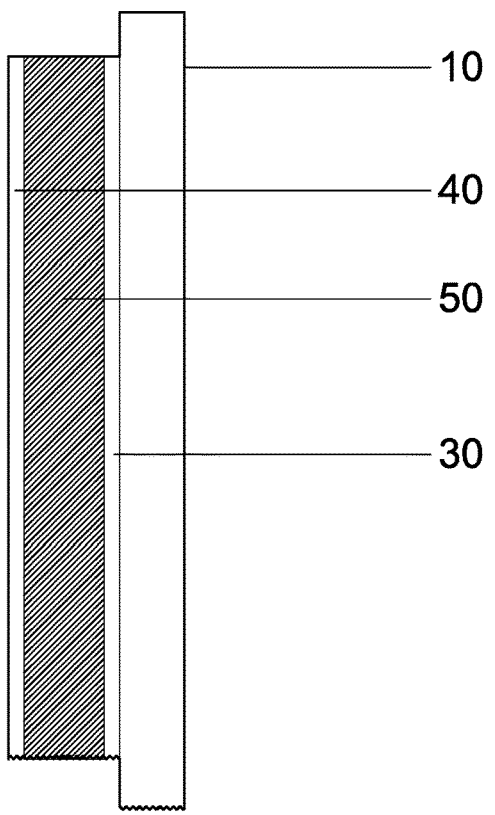
FIG. 6 shows a cross cut view of the sleeve being used to keep the user's hand warm.

FIG. 6 displays a crosscut of the sleeve 1 being used to keep a user's hand warm while drinking a cold drink. The insulation layer 30 goes against the surface of the beverage container 10 with the enclosure layer 40 on the outside side of the sleeve 1 with the heating layer 50 between the two layers. The enclosure layer 40 can have a grip able surface or material making it easier for the user to maintain their hold on the beverage container 10.

Figure 7:
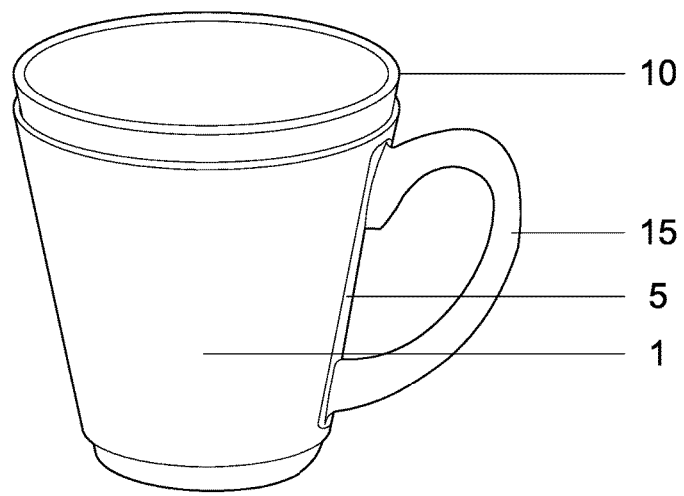
FIG. 7 shows a view of the heating sleeve round a beverage container.

The sleeves 1 can be made to fit any size or shape of beverage container 10 such as glasses, cups, bottles or cans. The sleeve 1 can even have a handle slot 5 so that the sleeve 1 can handle a cup's handle 15 with the handle 15 fitting into the handle slot 5 as shown in FIG. 7.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

That which is claimed is:

1. A sleeve to cover a beverage container comprising:
an insulation layer and a heating layer with an enclosure layer between the heating layer and the surface of the beverage container with the heating layer having a heating means where the heating means is a chemical reaction where the chemical reaction is an exothermic crystallization of supersaturated solutions.

2. The sleeve according to claim 1 further comprising having heating layer being the outside layer.

3. The sleeve according to claim 1 further comprising having insulation layer being the inside layer.

4. The sleeve according to claim 1 further comprising having heating layer being outside the insulation layer.

5. The sleeve according to claim 1 further comprising having sleeve in a shape of a wrap.

\* \* \* \* \*